United States Patent [19]

Dillard et al.

[11] 4,029,735
[45] June 14, 1977

[54] PROCESS FOR MAKING CALCIUM CHROMATE

[75] Inventors: Beverly M. Dillard, Clearwater; William W. Welbon, Belleair, both of Fla.

[73] Assignee: The United States of America as represented by the United States Energy Research and Development Administration, Washington, D.C.

[22] Filed: Oct. 9, 1975

[21] Appl. No.: 621,000

[52] U.S. Cl. .................................... 423/596
[51] Int. Cl.² ............................... C01G 37/14
[58] Field of Search ............... 423/596, 58, 61

[56] References Cited

UNITED STATES PATENTS

| | | | |
|---|---|---|---|
| 3,369,861 | 2/1968 | Benham et al. | 423/596 |
| 3,371,987 | 3/1968 | Vessey et al. | 423/596 |
| 3,393,972 | 7/1968 | Olson et al. | 423/596 |

FOREIGN PATENTS OR APPLICATIONS

| | | | |
|---|---|---|---|
| 666,628 | 2/1952 | United Kingdom | 423/596 |
| 122,172 | 3/1920 | United Kingdom | 423/596 |

Primary Examiner—Herbert T. Carter
Attorney, Agent, or Firm—Dean E. Carlson; Dudley W. King; Ignacio Resendez

[57] ABSTRACT

Ammonium chromate is contacted with calcium hydroxide to form calcium chromate.

1 Claim, 1 Drawing Figure

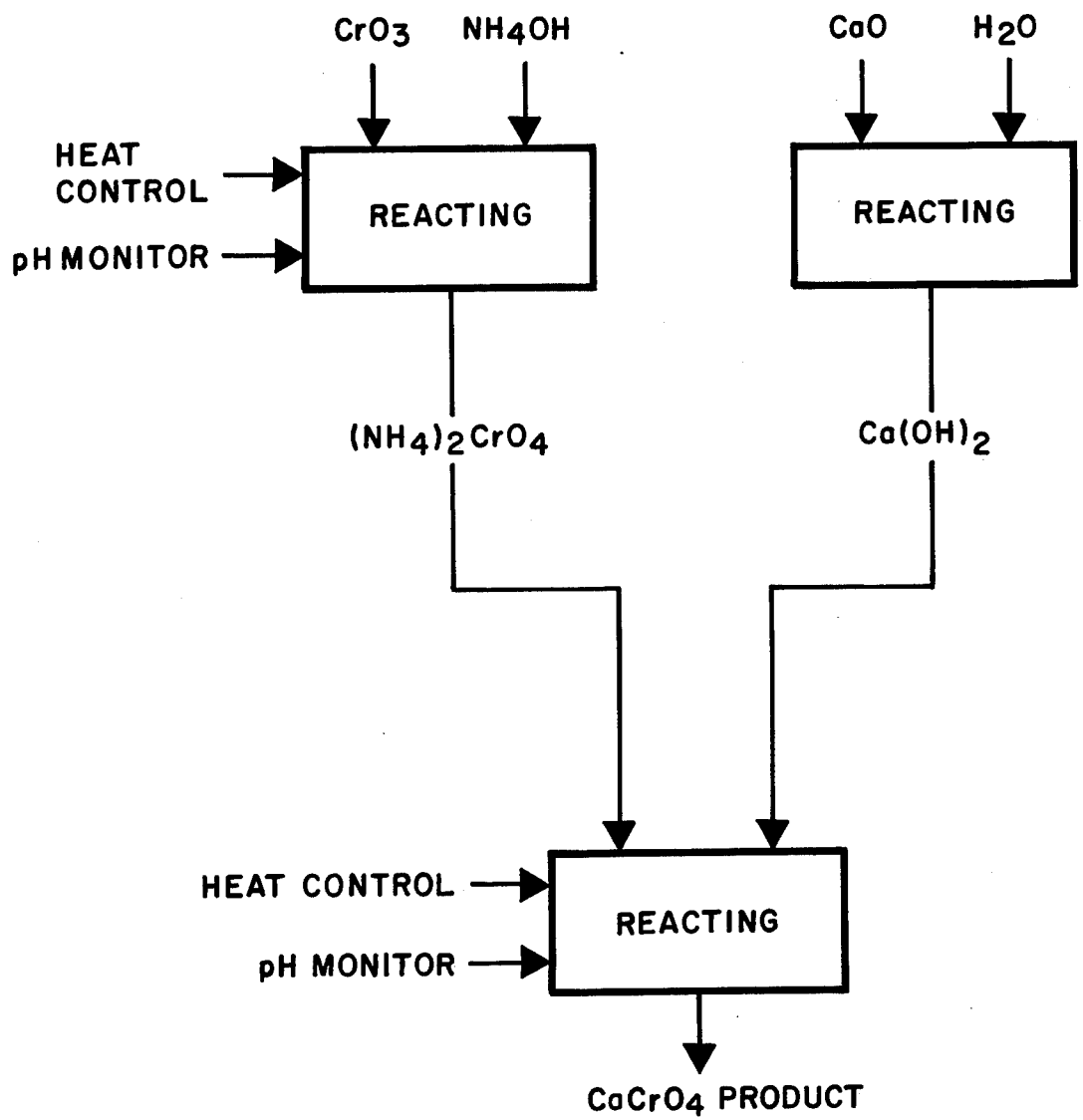

PROCESS FOR MAKING CALCIUM CHROMATE

BACKGROUND OF INVENTION

The invention relates to a process for making calcium chromate.

Calcium chromate is often used in metal primers, corrosion inhibition, battery depolarization, and other related applications. While there are various processes known for production of calcium chromate, there are several inherent disadvantages to these processes such as the need for high temperature in production processes, the need for reagent grade materials, the need for high pressures, and involvement with multi-step, complex chemical reactions. It is therefore desirable to provide a method for forming calcium chromate which overcomes these drawbacks or limitations.

SUMMARY OF INVENTION

In view of the above, it is an object of this invention to provide a process for forming calcium chromate that minimizes prior art limitations.

It is a further object of this invention to provide a process for forming calcium chromate that is relatively simple and permits in situ formation of the required reactants.

It is a further object of this invention to provide a process for forming calcium chromate wherein carbonate impurities in the product are minimized, and wherein said calcium chromate purity is at least 96%.

Various other objects and advantages will appear from the following description of this invention and the most novel features will be particularly pointed out hereinafter in connection with the appended claims. It will be understood that various changes in the details, materials and steps of the processes which are herein described and illustrated in order to explain the nature of the invention may be effected by those skilled in the art without departing from the scope of this invention.

The invention comprises contacting ammonium chromate with calcium hydroxide at appropriate temperature and pH levels to achieve a calcium chromate product. The ammonium chromate may be produced by the reaction of chromium trioxide with ammonium hydroxide and the calcium hydroxide may be produced by the reaction of calcium oxide with water.

DESCRIPTION OF DRAWING

The drawing illustrates a processing sequence for the use of this invention.

DETAILED DESCRIPTION

As shown in the drawing and illustrated in equation 1, calcium chromate product is produced by the reaction of ammonium chromate with calcium hyroxide. This reaction may be conducted at a temperature of from about 60° C. to about 90° C. and preferably between about 65 and about 70° C. while maintaining the pH at between about 7 and about 11, such that at the completion of the reaction the pH is at a basic range, and preferably is at between about 10 and about 11, thereby assuring the formation of chromate rather than dichromate.

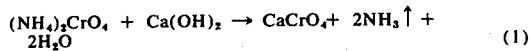

(1)

While the ammonium chromate may be prepared by other reactions, it may be desirable to prepare it immediately prior to its use in the above reaction and thereby overcome problems related to ammonium chromate instability. These problems are concerned with safety factors related to the storage in the vicinity of chromium trioxide. A preferred way to form the ammonium chromate may be by contacting aqueous chromium trioxide with ammonium hydroxide to form the ammonium chromate as illustrated in equation 2.

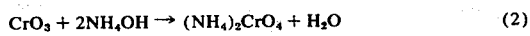

(2)

The quantities of the reactant proportions to be employed in the reactions illustrated by equations 1, 2 and 3, may be determined from stoichiometric considerations. In equation 2 the chromium trioxide may be added as an aqueous solution, at a chromium trioxide concentration of from about 40 to about 55% by weight, and preferably 50 to about 55% by weight. Commercially available technical grades of chromium trioxide and ammonium hydroxide may be employed in this reaction. The ammonium hydroxide may be added to an aqueous solution of chromium trioxide, the temperature of the reaction being controlled by the rate of addition of ammonium hydroxide. The temperature range for this reaction is from about 35° to about 75° C., and preferably from about 65° to about 75° C. Completion of the reaction is noted by completion of addition of stoichiometric amount of $NH_4OH$ and attainment of pH of approximately 7.

Calcium hydroxide may be formed by various processes, but it may be desirable to slake calcium oxide to thereby form a stable suspension of calcium hydroxide in water as shown in equation 3, and eliminate problems encountered in using calcium hydroxide suspensions which settle rapidly and require continuous stirring during addition to the ammonium chromate.

(3)

By employing calcium hydroxide formed in this manner, especially where the calcium oxide is slaked immediately prior to use, i.e., employing freshly slaked lime, carbon dioxide absorption is minimized and thereby carbonate impurities are eliminated or minimized. These carbonate impurities are undesirable because of undesirable reactions for some applications of calcium chromate and reduction in purity of product.

In one illustration of this invention, 185 milliliters (ml) of ammonium hydroxide solution containing 2.81 moles ammonia was added to a solution of chromium trioxide (141 grams chromium trioxide, 1.41 moles) in 120 ml of water. The temperature was maintained at approximately 70° C. Seventy-nine grams of calcium oxide (1.41 moles) freshly slaked in 300 ml of water was added to the ammonium chromate solution formed from this reaction. A yellow precipitate formed immediately. The pH at the end of the reaction was 10.3. The precipitate was digested for one hour, filtered through a Buchner funnel by vacuum filtration, and dried at 110° C. The product obtained was 97.6% calcium chromate.

In other runs using this invention by the process described above, products that were 97.0, 96.2 and 97.5% calcium chromate were obtained. This is adequate purity for most calcium chromate applications, such as for thermal battery applications.

The evolution of ammonia gas and the insolubility of calcium chromate in an alkaline medium serves to drive reaction 1 to completion and thereby increase the products yield. The calcium chromate product, which is suspended within the aqueous solution of equation 1, may be filtered through a suitable process such as centrifugal filtration, dried by using appropriate drying processes such as oven drying at 110° C., and thereafter milled or otherwise comminuted to obtain the desired particle size.

Calcium chromate product made by the process of this invention has a particle size as filtered of between about 1 and about 100 microns with an average particle size of about 30 microns.

Other advantages of using this process include the generation of heat from the chemical reaction of chromium trioxide and ammonium hydroxide thus eliminating the need for external heating. In addition, the process of this invention may use technical grade materials eliminating the need for more expensive reagent grade materials which may be required by prior art processes to achieve a calcium chromate product of greater than about 96% purity.

What we claim is:

1. A process for forming calcium chromate comprising: reacting aqueous chromium trioxide with ammonium hydroxide to form aqueous ammonium chromate by adding the ammonium hydroxide to the aqueous chromium trioxide at a rate establishing and thereafter maintaining a temperature of about 65° to 75° C until a pH of about 7 is attained; and reacting calcium oxide with water to form an aqueous suspension of calcium hydroxide and reacting the aqueous ammonium chromate and the calcium hydroxide to form the calcium chromate by adding the aqueous calcium hydroxide suspension to the aqueous ammonium chromate at a rate establishing and thereafter maintaining a temperature of about 65° to 70° C until a pH of about 10 to 11 is attained.

* * * * *